(12) United States Patent
Wang

(10) Patent No.: US 7,436,452 B2
(45) Date of Patent: Oct. 14, 2008

(54) METHOD AND APPARATUS FOR REDUCTION OF RESIDUAL SIGNAL IN DIGITAL IMAGES CAPTURED BY IMAGE SENSORS

(75) Inventor: Shen Wang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 658 days.

(21) Appl. No.: 10/900,722

(22) Filed: Jul. 28, 2004

(65) Prior Publication Data

US 2006/0023112 A1    Feb. 2, 2006

(51) Int. Cl.
*H04N 5/238* (2006.01)
(52) U.S. Cl. .................. 348/364; 348/312; 348/296
(58) Field of Classification Search ............ 348/362, 348/241, 243, 248, 297, 299
See application file for complete search history.

(56) References Cited

U.S. PATENT DOCUMENTS

| 4,556,911 | A | * | 12/1985 | Imaide et al. | 348/297 |
| 4,985,775 | A | | 1/1991 | Murayama et al. | |
| 5,398,063 | A | * | 3/1995 | Yamana | 348/345 |
| 7,136,100 | B1 | * | 11/2006 | Kato et al. | 348/241 |
| 7,274,391 | B2 | * | 9/2007 | Shepherd et al. | 348/243 |
| 2002/0186308 | A1 | | 12/2002 | Baer | |
| 2003/0048371 | A1 | * | 3/2003 | Oda | 348/312 |

FOREIGN PATENT DOCUMENTS

JP    62-152281    7/1987

\* cited by examiner

*Primary Examiner*—Ngoc-Yen T. Vu
*Assistant Examiner*—Cynthia Calderon
(74) *Attorney, Agent, or Firm*—Nancy R. Simon

(57) ABSTRACT

A method for reducing residual signal from a first image from appearing in a second image, the method includes the steps of capturing the first image on an image sensor having a known exposure that includes exposure time and a peak light intensity; estimating a flush time for the second image based on the known exposure in capturing the first image; and capturing the second image using the estimated flush time for substantially reducing the residual signal.

19 Claims, 5 Drawing Sheets

METHOD AND APPARATUS FOR REDUCTION OF RESIDUAL SIGNAL IN DIGITAL IMAGES CAPTURED BY IMAGE SENSORS

FIELD OF THE INVENTION

This invention relates to the field of digital imaging and, more particularly, to an apparatus and method for reducing the residual signal in digital images captured by a digital camera using an image sensor.

BACKGROUND OF THE INVENTION

A traditional camera system includes camera body, lens, electronics to control the functionality of the camera and most importantly the image-capturing media—film. In contrast, instead of using film, a digital camera system usually employs an image sensor made on semiconductor substrate. Typically the image sensor is either a charge coupled device (CCD) or a complementary metal oxide semiconductor (CMOS) sensor. There are several types of CCD sensors, such as frame transfer CCD, full frame CCD, interline CCD and linear CCD sensors. For purposes of an illustrative embodiment, the image sensor of a full frame CCD is discussed for illustrating the effects of a residual signal.

A full frame CCD consists of a two-dimensional array of photosensitive elements of X columns by Y rows. The sensor captures light during exposure and converts photons to electrical charge, namely electrons. At the end of exposure, it starts the readout process. First it transfers all the electrons vertically row by row to a serial of horizontal registers. After each row transfer, the charge in the horizontal registers is transferred out to a sensing node, namely a floating diffusion, and converted to a voltage signal. An analog-to-digital converter converts this voltage to a digital count. A single image capture is completed when all the rows of signals are transferred out and converted. Finally the onboard electronics renders all the digital counts into a digital image. At this time, the camera is ready for the next capture.

A digital camera with a full frame CCD captures a single still image in the following manner. When a mechanical shutter is pressed, a flush cycle with a fixed amount of time is executed to clear out the existing charge in the CCD (see Japanese Patent No: JP62152281 for further discussion). This is because the existing charge, namely the dark current, is accumulated during either the camera power off period or camera standby period. This dark current needs to be cleared out. Then the exposure process begins and charge starts to accumulate in the CCD. The close of the shutter ends the exposure and starts the readout process in which the charge is transferred out of the CCD and converted to a digital image.

The digital camera with a full frame CCD usually only captures still images, not videos. The reason for this is that for the high frame rate required by the video mode, a mechanical shutter is not practical to use. As a result, photon-induced charge continues to accumulate even after the exposure period when the accumulated charge is being transferred out of CCD. This additional charge results in an artifact, namely smear, to appear in the images. Therefore, video capture usually is not an option for a digital camera using a full frame CCD sensor. There are ways to reduce smear without a mechanical shutter (see US Patent Application Publication No: US2002/0186308A1).

However, many high-end digital cameras using a full frame CCD sensor have a so-called continuous capture mode, which allows users to continuously capture several images in a row. In order to get high quality images for all images, several obstacles need to be overcome and they are smear, dark current and the residual signal. The smear problem can be solved by using a mechanical shutter if the frame rate is not very fast. For example, the frame rate for an 8 million pixel CCD operating at 30 Mhz pixel rate is about 0.3 seconds, which is long enough for a mechanical shutter to operate smoothly. Removal of dark current can be achieved by subtracting a dark image with the same exposure time captured at the end of continuous capture mode with the shutter closed.

The residual signal, however, cannot be solved by either a mechanical shutter or a dark current subtraction. It is defined that charge related to the previous image is superimposed on the next image when the camera operates in its continuous capture mode. Referring to FIG. 1A and FIG. 1B, there are shown two scene settings for testing residual signal in a full frame CCD. In both cases, there is a candle 1 on a table. In FIG. 1A, the candle 1 is lit and has a flare 2 while in FIG. 1B the candle 1 is put off and the flare is gone. Referring to FIG. 1C and FIG. 1D, two images continuously captured from these two scenes using a camera in its two-image-capture mode are shown. In the FIG. 1D a residual image 3 of the flare 2 is still visible in the image although in the real scene (FIG. 1B) there is no such flare 2.

When light strikes onto a full frame CCD during the first image exposure, some photon-generated charges are trapped in some pixels due to the crystal defects in the silicon. After exposure, these traps start to release trapped charge gradually. If during the second image exposure and readout, these traps still release charge, the total charge in the second image will be the summation of the charge due to second exposure and the charge released from the traps generated during the first exposure. Therefore, the second image will have a residual image of the first image in it. This phenomenon will become especially worse when the first image has a strong illumination scene such as FIG. 1A.

The residual charge is due to the thermal release of charge from trapping sites in a CCD. The number of traps is exponentially proportional to light intensity and exposure time. Referring to FIG. 2, there is shown the relationship between the residual signal generated at the end of the first exposure and the exposure time for different light intensities. Under light intensity of 0.5 Esat, the residual signal increases from 0 to about 45 electrons for a five-second exposure. Esat is a relative light intensity unit. If an image sensor's output equals to its saturation level when it is illuminated under a light source for a fixed amount of exposure time, that light intensity is defined as 1 Esat. At the same exposure time, the residual signal also increases with the light intensity. At 20 Esat, it reaches about 115 electrons at 5 seconds.

After the first exposure, the traps will release the trapped charge and the process will slow down and eventually diminish with time. Theoretically, by adding infinite flush time between the end of the first image readout and the start of second image exposure, the residual signal will be eliminated in the second image because all the charge in the traps will be released and flushed out during this infinite time before the next exposure begins. However, in the practical use, the flush time cannot be set for too long. Otherwise, a camera user may feel a delay between each continuous capture and that delay may result in missing important scenes.

On the other hand, by setting a predefined maximum-allowable flush time sometimes can cause unnecessary slow-down of the continuous capture process if the illumination of a scene is not quite as strong as to generate a substantial residual signal beyond the camera's tolerance.

Therefore, there is a need for a method to automatically adjust the flush time based on the exposure information of a previous image capture and substantially reduce the residual signal in the next image in a continuous capture mode by a digital camera.

SUMMARY OF THE INVENTION

The present invention is directed to overcoming one or more of the problems set forth above. Briefly summarized, according to one aspect of the present invention, the invention resides in a method for reducing residual signal from a first image from appearing in a second image, the method comprising the steps of capturing the first image on an image sensor having a known exposure that includes exposure time and a peak light intensity; estimating a flush time for the second image based on the known exposure in capturing the first image; capturing the second image using the estimated flush time for substantially reducing the residual signal.

It is therefore an object of the present invention to automatically adjust the flush time based on the exposure information of a previous image capture and substantially reduce the residual signal in the next image in a continuous capture mode by a digital camera using an image sensor.

This object is achieved by a method to determine an optimal flush time based on the relationship between the residual signal and the flush time. The residual signal in the next image is estimated based on the previous exposure which is the multiplication of the light intensity measured by a light meter and the exposure time.

DETAILED DESCRIPTION OF THE INVENTION

Figure 3:
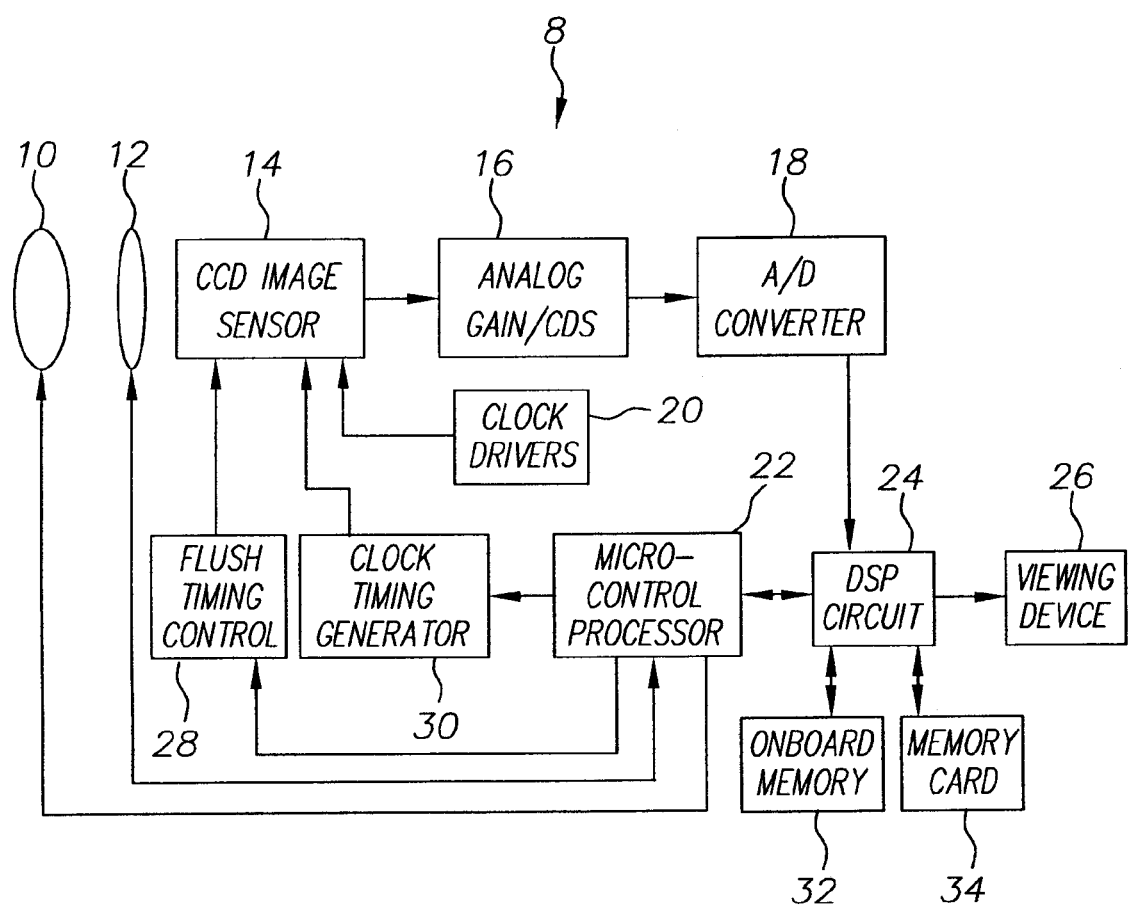
FIG. 3 is a block diagram for a digital camera system in accordance with the invention.

Referring to FIG. 3, there is shown a representative diagram showing a digital camera system 8 in accordance with the present invention. An image sensor 14 (preferably a CCD) is positioned in front of a lens with a mechanical shutter (the combination of the lens and the shutter is illustrated as 10). A light meter 12 measures the light intensity of the scene of interest passing through the lens-shutter fixture 10. This value is saved in an onboard memory 32 for the future use. A microcontrol processor 22 controls the lens fixture 10 and it also controls a flush timing control 28. The image sensor 14 is driven by clock drivers 20 and a clock-timing generator 30 which is also controlled by the microcontrol processor 22. The analog-to-digital chain includes an analog gain and correlated double sampling (CDS) unit 16 and an analog-to-digital converter (ADC) 18. The digital counts related to the scene of interest are processed by a digital signal processor (DSP) circuit 24 and finally transferred to either a viewing device 26 like a display or a memory card like a flash memory 34. The onboard memory 32 saves exposure information of the last image such as exposure time and light intensity. The microcontrol processor 22 uses the information to calculate the flush time for the next image capture if the camera system is operated in a continuous image capture mode.

Figure 4:
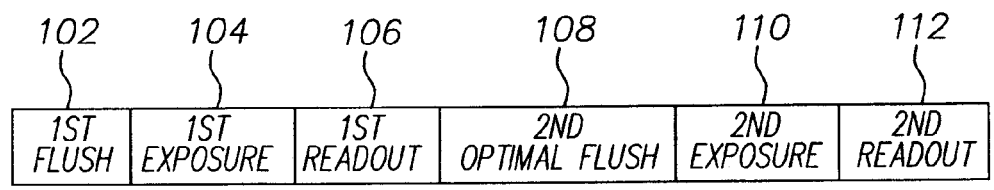
FIG. 4 is a block diagram of the image sensor timing to reduce the residual signal in the second image for a two-image-capture operation.

Referring to FIG. 4, there is shown a diagram showing the timing sequence in accordance with the present invention, assuming the digital camera system continuously captures two images in a row. The $1^{st}$ flush 102 is a flush cycle which is used to primarily remove the dark current in the image sensor pixels during either power off or standby period. Then the $1^{st}$ exposure 104 is initiated. After $1^{st}$ exposure 104, $1^{st}$ readout 106 is executed and the first image is outputted. Immediately, based on the $1^{st}$ exposure 104 including the exposure time (derived from the camera) and the light intensity, the microcontrol processor 22 calculates the optimal flush time for the $2^{nd}$ flush 108 through either the lookup tables or the predefined fit-curves and starts the second image capture process including $2^{nd}$ exposure 110 and $2^{nd}$ readout 112. The $2^{nd}$ flush 108 will substantially remove the residual signal while in the meantime it keeps the delay between two images captured at minimum.

Figure 5:
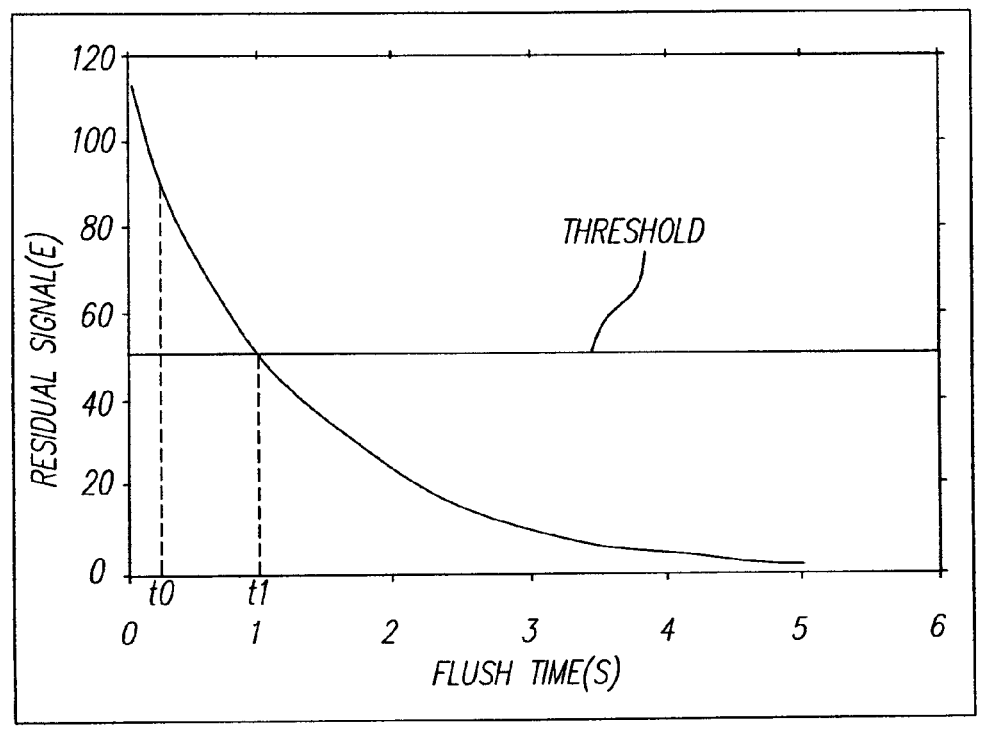
FIG. 5 is a chart showing the relationship between the residual signal and the flush time in the second image.

The process of determination of the optimal flush time is based on the relationship between the residual signal and the flush time for the second capture and this relationship is shown in FIG. 5. A threshold of the residual signal is defined as the maximum residual signal which a digital camera system can tolerate without sacrificing the image quality it captures. Suppose the estimated residual signal which will appear in the second image if, without any flush, is 90 electrons and the threshold is only is 50 electrons, the necessary flush time will be t1-t0, i.e., 0.75 seconds to remove the residual signal in the second image to the level which the camera can tolerate.

The onboard memory 32 in the digital camera system can store a plurality of lookup tables of the residual signal versus exposure time for different light intensities (FIG. 2) and another lookup table of the residual signal versus flush time (FIG. 5). Therefore, once the previous light intensity and exposure time are known, the system can immediately calculate the optimal flush time for the next capture by searching these lookup tables.

Another method is to store the parameters of a plurality of fit-curves of the residual signal versus exposure time for different light intensities (FIG. 2) and the parameters of another fit-curve of the residual signal versus flush time (FIG. 5). For example, in a linear curve, the only parameters of the fit-curve that are stored are the slope and the intercept. The flush time will then be interpolated and calculated based on these parameters of the fit-curves.

Figure 1A:
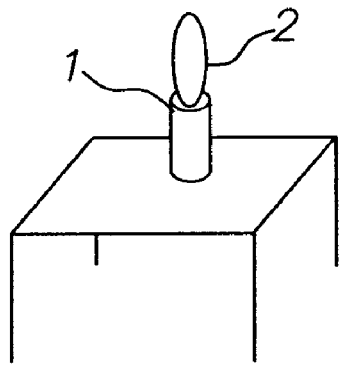
FIGS. 1A-1D are illustrations of a residual signal.
Figure 1B:
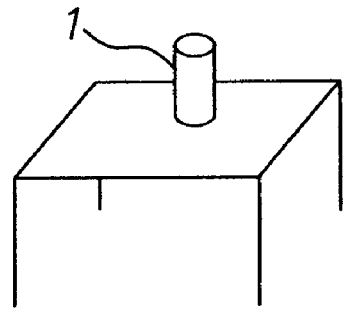
Figure 1C:
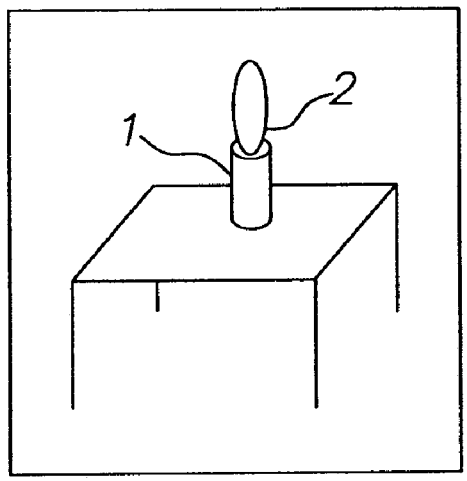
Figure 1D:
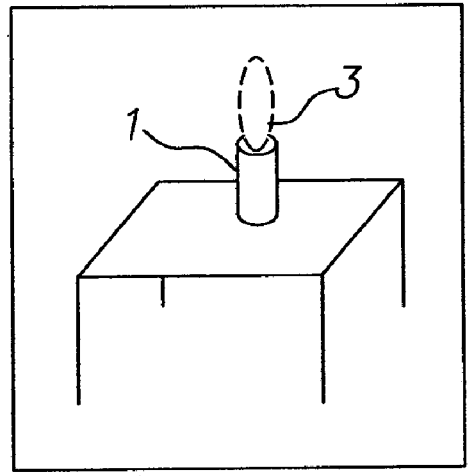
Figure 2:
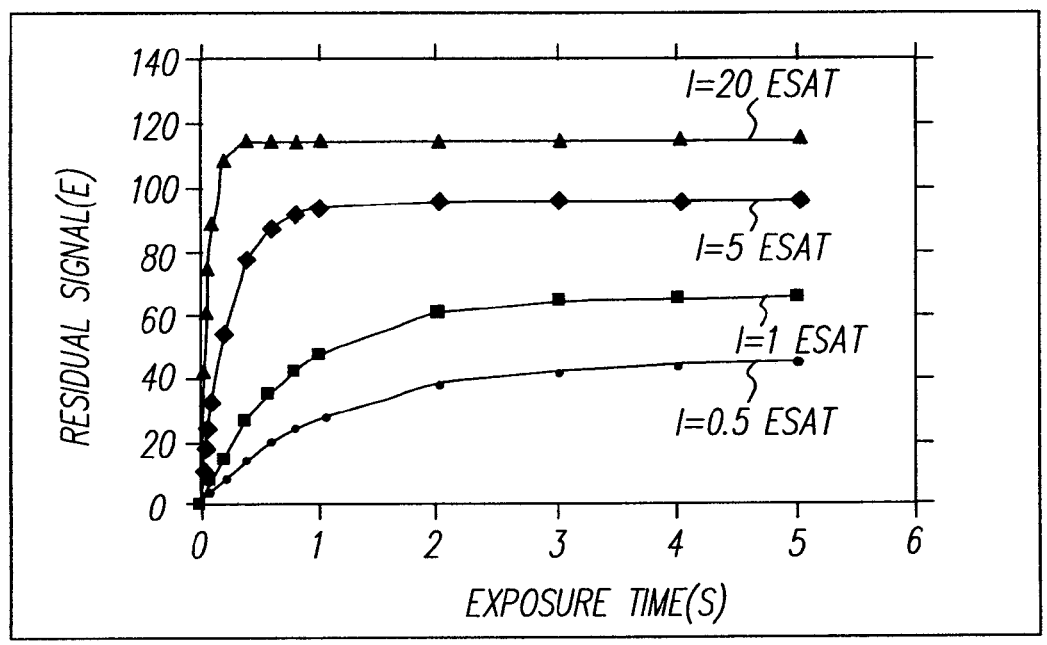
FIG. 2 is a chart showing the relationship between the residual signal generated at the end of the exposure and the exposure time for different light intensities.
Figure 6:
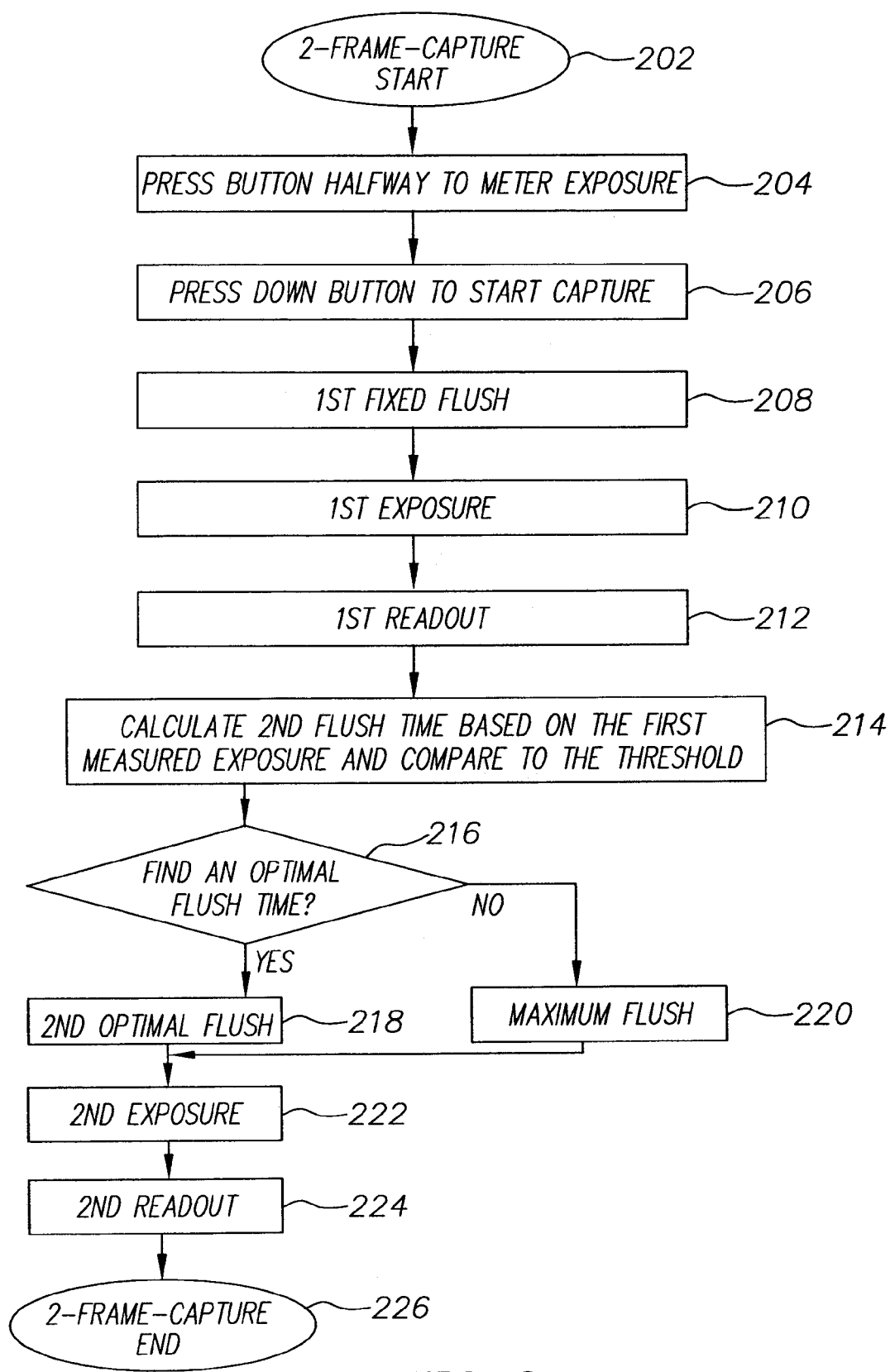
FIG. 6 is a flow chart of a method of automatically reducing the residual signal for a two-image-capture operation.

Referring to FIG. 6, there is shown a flowchart of a 2-image-capture mode in accordance to the present invention. When this mode 202 starts, a user presses a shutter button halfway to measure light intensity 204. After the button is fully pressed down 206, the $1^{st}$ fixed flush 208 is executed to remove the background dark current. Then the mechanical shutter is opened to start $1^{st}$ exposure 210. The light intensities and exposure time are saved in the onboard memory 32 for later retrieval. After that, the mechanical shutter is closed to start $1^{st}$ readout 212. Once finishing the $1^{st}$ readout 212, the microcontrol processor 22 first retrieves the exposure information of the measured light intensity and the exposure time from the onboard memory 32 and then estimates the residual signal which will appear in the second image if without any flush based on the relationship between the residual signal and exposure (FIG. 2). Finally it calculates the optimal flush time 214 based on a predefined threshold of residual signal level (FIG. 5) and the relationship between the residual signal and the flush time. A comparison 216 decides if an optimal flush time 218 or a maximum allowable flush time 220 is used. A maximum flush time 220 is the maximum time the camera system allows before a user will not notice a significant amount of delay between two continuously captured images. This only occurs when the scene has an extreme bright illumination which generates a residual signal so large that a maximum flush time is needed to reduce the residual signal. After the flush, the mechanical shutter is opened again and starts the $2^{nd}$ exposure 222, and then the shutter is closed and the $2^{nd}$ readout 224 is executed. The 2-image-capture mode 226 ends with two images either stored in memory card 34 or outputted to a viewing device 26.

This invention has been described in detail with a particular configuration of a two-image continuous capture mode, but it will be understood that it can also apply to N-image continuous capture mode.

PARTS LIST 1 candle
2 flare
3 residual image
8 digital camera system
10 lens-shutter fixture
12 light meter
14 CCD image sensor
16 analog gain/CDS unit
18 A/D converter
20 clock drivers
22 microcontrol processor
24 DSP circuit
26 viewing device
28 flush timing control
30 clock timing generator
32 onboard memory
34 memory card
102 $1^{st}$ flush
104 $1^{st}$ exposure
106 $1^{st}$ readout
108 $2^{nd}$ flush
110 $2^{nd}$ exposure
112 $2^{nd}$ readout
202 start
204 meter exposure/light intensity
206 start capture
208 $1^{st}$ fixed flush
210 $1^{st}$ exposure
212 $1^{st}$ readout
214 calculate flush time
216 comparison
218 $2^{nd}$ optimal flush
220 maximum flush
222 $2^{nd}$ exposure
224 $2^{nd}$ readout
226 2-frame-capture end

The invention claimed is:

1. A method for reducing residual signal generated during a first image exposure and released during the image exposure and readout of a second image, the method comprising the steps of:
    (a) flushing an image sensor using a predefined fixed flush time;
    (b) after flushing with the fixed flush time, capturing the first image on an the image sensor having a known exposure that includes exposure time and a peak light intensity;
    (c) after the first image is captured, reading out the first image;
    (d) estimating a flush time for the second image based on the known exposure in capturing the first image;
    (e) after the first image is read out, flushing the image sensor using the estimated flush time for the second image; and
    (f) capturing the second image, wherein the estimated flush time for the second image substantially reduces the residual signal in the second image.

2. The method as in claim 1, wherein step (d) includes providing either lookup tables or fit-curves in estimating the flush time.

3. The method as in claim 2, wherein step (d) includes providing the lockup tables or fit-curves each representing the relationship between the residual signal and exposure.

4. The method as in claim 3, wherein step (d) includes calculating the flush time based on a predetermined threshold of a tolerance of the residual signal.

5. The method as in claim 4, wherein the lookup tables each includes values of the residual signal versus the flush time, and the fit-curves each includes parameters used to interpolate a relationship between the residual signal versus the flush time.

6. The method as in claim 1, further comprising the step of (g) reading out the second image.

7. The method as in claim 6, further comprising repeating for each subsequent image to be captured the steps of:
    (h) estimating a flush time for a subsequent image based on a known exposure in capturing a previous image;
    (i) after the previous image is read out, flushing the image sensor using the estimated flush time for the subsequent image;
    (j) capturing the subsequent image; and
    (k) reading out the subsequent image.

8. A digital camera for reducing residual signal generated during a first image exposure and released during the image exposure and readout of a second image, the digital camera comprising:
    (a) an image sensor that captures the first image having a known exposure that includes exposure time and a peak light intensity; and
    (b) a microcontrol processor that estimates a flush time for the second image based on the known exposure in capturing the first image and determines whether to use the estimated flush time or a maximum allowable flush time; wherein the image sensor captures the second image after the image sensor is flushed using either the estimated flush time or the maximum allowable flush time for substantially reducing the residual signal in the second image.

9. The digital camera as in claim 8 further comprising onboard memory that includes either lookup tables or fit-curves used in estimating the flush time.

10. The digital camera as in claim 9, wherein the lookup tables or fit-curves comprises a plurality of curves each representing the relationship between the residual signal and exposure.

11. The digital camera as in claim 10, wherein the microcontrol processor calculates the flush time based on a predetermined threshold of a tolerance of the residual signal.

12. The digital camera as in claim 11, wherein the lookup tables each includes values of the residual signal versus the flush time, and the fit-curves each includes parameters used to interpolate a relationship between the residual signal versus the flush time.

13. A method for reducing residual signal generated during a first image exposure and released during the image exposure and readout of a second image, the method comprising the steps of:
- (a) flushing an image sensor using a predefined fixed flush time;
- (b) after flushing the image sensor with the fixed flush time, capturing the first image using a known exposure that includes exposure time and a peak light intensity;
- (c) after the first image is captured, reading out the first image;
- (d) estimating a residual signal level using the known exposure in capturing the first image, and based on the estimated residual signal level, estimating a flush time for the second image;
- (e) determining whether to use the estimated flush time or a maximum allowable flush time;
- (f) after the first image is read out, flushing the image sensor using the flush time determined in step (e); and
- (g) capturing the second image.

14. The method of claim 13, further comprising the step of (h) reading out the second image.

15. The method as in claim 14, further comprising repeating for each subsequent image to be captured by the image sensor the steps of:
- (i) estimating a residual signal level using a known exposure in capturing a previous image, and based on the estimated residual signal level, estimating a flush time for a subsequent image;
- (j) determining whether to use the estimated flush time or the maximum allowable flush time;
- (k) after the previous image is read out, flushing the image sensor using the flush time determined in step (j);
- (l) capturing the subsequent image; and
- (m) reading out the subsequent image.

16. The method as in claim 13, wherein step (d) includes providing either lookup tables or fit-curves in estimating the flush time.

17. The method as in claim 16, wherein step (d) includes providing the lookup tables or fit-curves each representing the relationship between residual signal levels and exposure times.

18. The method as in claim 17, wherein step (d) includes estimating the flush time for the second image based on a predetermined threshold of a tolerance of the residual signal level.

19. The method as in claim 18, wherein the lookup tables each includes values of the residual signal level versus the flush time, and the fit-curves each includes parameters used to interpolate a relationship between the residual signal level versus the flush time.

* * * * *

UNITED STATES PATENT AND TRADEMARK OFFICE
CERTIFICATE OF CORRECTION

PATENT NO. : 7,436,452 B2 Page 1 of 1
APPLICATION NO. : 10/900722
DATED : October 14, 2008
INVENTOR(S) : Shen Wang It is certified that error appears in the above-identified patent and that said Letters Patent is hereby corrected as shown below:

Col. 6 Claim 1, line 2      after "on", delete "an".

Col. 6 Claim 3, line 19     "lockup" should be replaced with --lookup--.

Signed and Sealed this

Seventeenth Day of February, 2009

JOHN DOLL
*Acting Director of the United States Patent and Trademark Office*